G. O. HALL.
Tenoning Machines.
No. 231,310.  Patented Aug. 17, 1880.
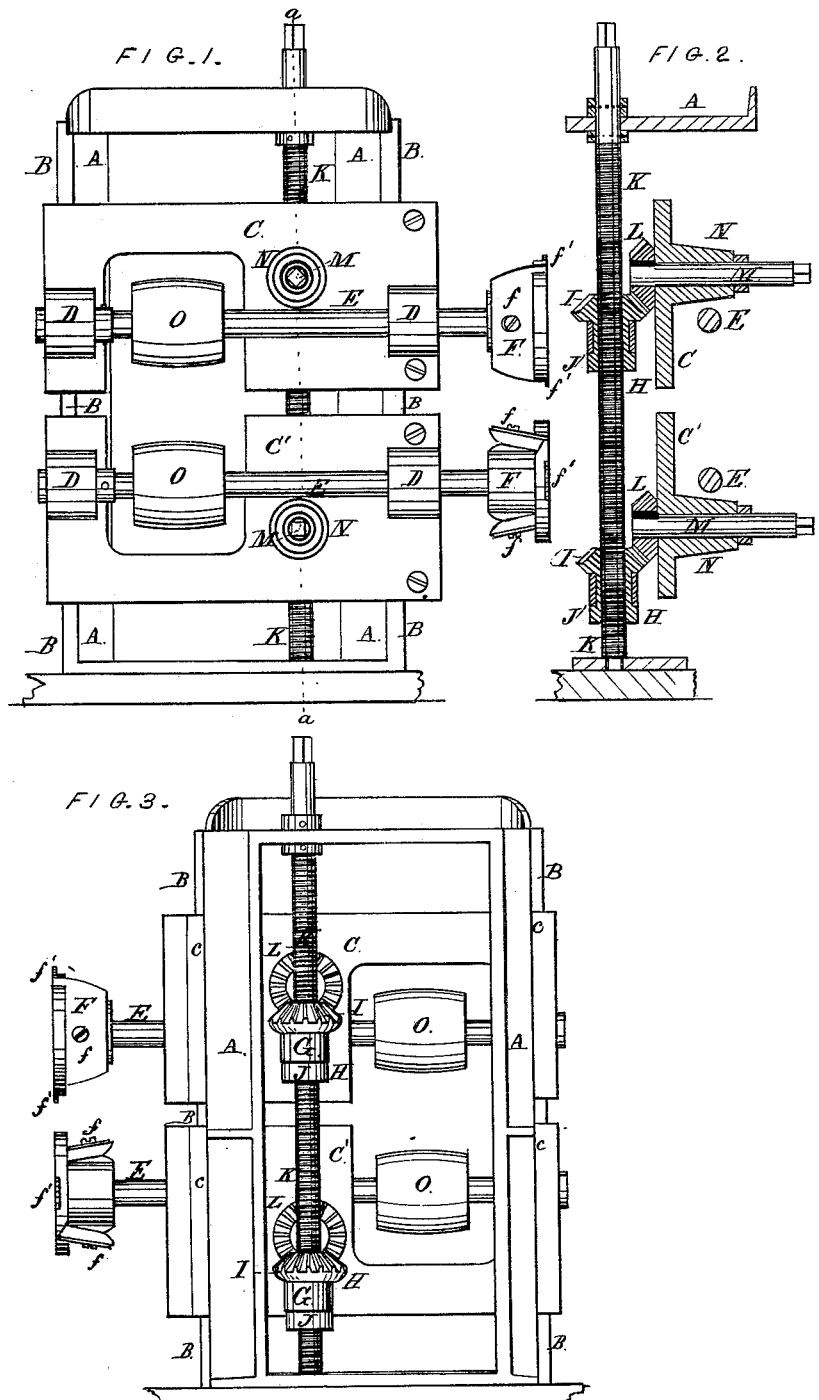

United States Patent Office.

GORHAM O. HALL, OF ST. LOUIS, MISSOURI.

TENONING-MACHINE.

SPECIFICATION forming part of Letters Patent No. 231,310, dated August 17, 1880.

Application filed March 8, 1880. (No model.)

*To all whom it may concern:*

Be it known that I, GORHAM O. HALL, of the city of St. Louis, in the State of Missouri, have invented a certain new and useful Improvement in Tenoning-Machines, of which the following is a full, clear, and exact description, reference being had to the accompanying drawings, forming part of this specification.

My improvement relates to the device for giving to the head-stocks the required vertical adjustments; and it consists in supporting the head-stocks in their vertical position by a vertical screw, each head-stock being supported on a screw-threaded collar or nut on the screw, said collar forming the hub of a bevel-wheel and turning in an ear or lug of the head-stock or adjustable plate in which the cutter-shaft has bearing. The construction is such that the head-stocks are raised and lowered simultaneously by the turning of the vertical supporting-screw, and each of the head-stocks has independent vertical adjustment by the turning of its supporting-nut upon the screw. The bevel-wheel nut is turned by a bevel-wheel on a spindle to whose end a winch is placed.

In the drawings, Figure 1 is a front elevation. Fig. 2 is a section at *a a*, Fig. 1. Fig. 3 is a rear elevation.

A is the frame, having vertical guides B B, on which the plates or head-stocks C C' are adjustable vertically. The head-stocks are fitted to the angular guides B with lips or ribs *c c*, which engage the rear sides of the guides. The head-stocks have upon their front side ears D D, giving journal-bearing to the cutter-shafts E E.

I make no claim to novelty in the cutter-shafts E or rotary cutter-heads F. The latter are shown with side cutters, *f*, and cross-cutters *f'*.
On the rear sides of the head-stocks C C' are fixed ears G G, in which turn nuts H H, having bearing on top of the ear G by a bevel-cog wheel, I, and upon the bottom of the ear by a collar, J. The nuts H H screw upon a vertical screw, K, which thus acts to support the head-stocks and hold them in position. Thus it will be seen that by turning the screw K the head-stocks C C' are either raised or lowered simultaneously and equally.

As the means for giving independent adjustment to the two head-stocks, I turn the nut H, connected with said head-stocks, upon the screw K. This is done by the rotation of a bevel-wheel L, engaging the bevel-wheel I of the nut, and attached to the end of the spindle M, turning in a socket N of the head-stock. These spindles, like the screw K, may be turned by hand-wheels, hand-cranks, or any suitable means. I have shown them fitted to receive a crank-key or winch upon their angular ends for this purpose.

The stuff to be tenoned may be held in any suitable carriage and fed between the cutter-heads F. A tenon of any required thickness may be formed upon it, or a rabbet-groove may be formed along the edge of a board or piece of timber upon the upper or under side, or both.

O O are the driving-belt pulleys upon the cutter-shafts. These are usually driven by a single belt with an idler to keep it taut; but separate belts may be used.

I do not confine myself to the bevel-gears I L as a means of turning the supporting-nuts H. The same movement might be accomplished by other means. I will instance a screw-wheel upon the nut I and a gear-screw or worm upon the shaft M. I prefer the bevel-gear, as giving more speedy adjustment.

I claim as my invention—

1. The combination of vertical adjusting-screw K, ears or bearings G, secured to the head-stocks C C', and the nuts H, having bearing upon said ears and working upon the vertical screw, as and for the purpose set forth.

2. The combination of screw K, turning in bearings in the frame, for imparting vertical adjustment to the head-stocks C C', nuts H, having bearings in ears G upon said head-stocks, and pinions L, or equivalent means, carried by the head-stocks, for operating the supporting-nuts H, substantially as described.

GORHAM O. HALL.

Witnesses:
SAML. KNIGHT,
GEO. H. KNIGHT.